United States Patent [19]

Kirk

[11] Patent Number: 4,921,267

[45] Date of Patent: May 1, 1990

[54] BICYCLE AND FRAME THEREFOR

[76] Inventor: Francis G. Kirk, 12, Kenworthy Road, Braintree, Essex, England

[21] Appl. No.: 376,939

[22] Filed: Jul. 5, 1989

Related U.S. Application Data

[63] Continuation-in-part of Ser. No. 930,976, Nov. 13, 1986, abandoned, which is a continuation of Ser. No. 654,316, Sep. 25, 1984, abandoned.

[51] Int. Cl.[5] ...................... B62K 19/02; B62K 19/12
[52] U.S. Cl. ................................................ 280/281.1
[58] Field of Search .................... 280/281.1, 274, 278, 280/279, 287

[56] References Cited

U.S. PATENT DOCUMENTS

| | | | |
|---|---|---|---|
| 2,470,441 | 5/1949 | Maier et al. | 280/281 R |
| 2,855,219 | 10/1958 | Douglas | 280/281 R |
| 3,833,242 | 9/1974 | Thompson | 280/281 R |
| 3,866,946 | 2/1975 | Robison | 280/279 |
| 4,015,854 | 4/1977 | Ramond | 280/281 R |
| 4,368,897 | 1/1983 | Brown | 280/281 B |
| 4,500,103 | 2/1985 | Klein | 280/281 R |
| 4,746,136 | 5/1988 | Kirk | 280/281 R |

FOREIGN PATENT DOCUMENTS

| | | | |
|---|---|---|---|
| 669766 | 11/1929 | France . | |
| 867740 | 11/1941 | France | 280/281 |
| 979506 | 12/1950 | France | 280/281 R |
| 1054040 | 2/1954 | France . | |
| 401132 | 6/1943 | Italy | 280/281 R |
| 445268 | 2/1949 | Italy | 280/281 R |
| 523924 | 4/1955 | Italy | 280/279 |
| 107114 | 10/1924 | Switzerland . | |
| 292767 | 6/1928 | United Kingdom . | |
| 329046 | 5/1930 | United Kingdom . | |
| 354160 | 8/1931 | United Kingdom . | |
| 657011 | 9/1951 | United Kingdom | 280/281 R |
| 425503 | 3/1984 | United Kingdom . | |

*Primary Examiner*—Mitchell J. Hill
*Attorney, Agent, or Firm*—Toren, McGeady & Associates

[57] ABSTRACT

A light weight bicycle frame has open section, e.g. I section, parts cast in a light weight metal or alloy, preferably a magnesium alloy. A frame consists of an upper bar, and a lower bar, a saddle stem, a head, and rear forks. The bars are of I section and the saddle stem is of U section merging into or taking a tubular section receiving a saddle support tube. A structural bridge of I section interconnects the bars. The lower bar joins the saddle stem at a point intermediate the ends thereof and above the bearing for a crank wheel.

3 Claims, 5 Drawing Sheets

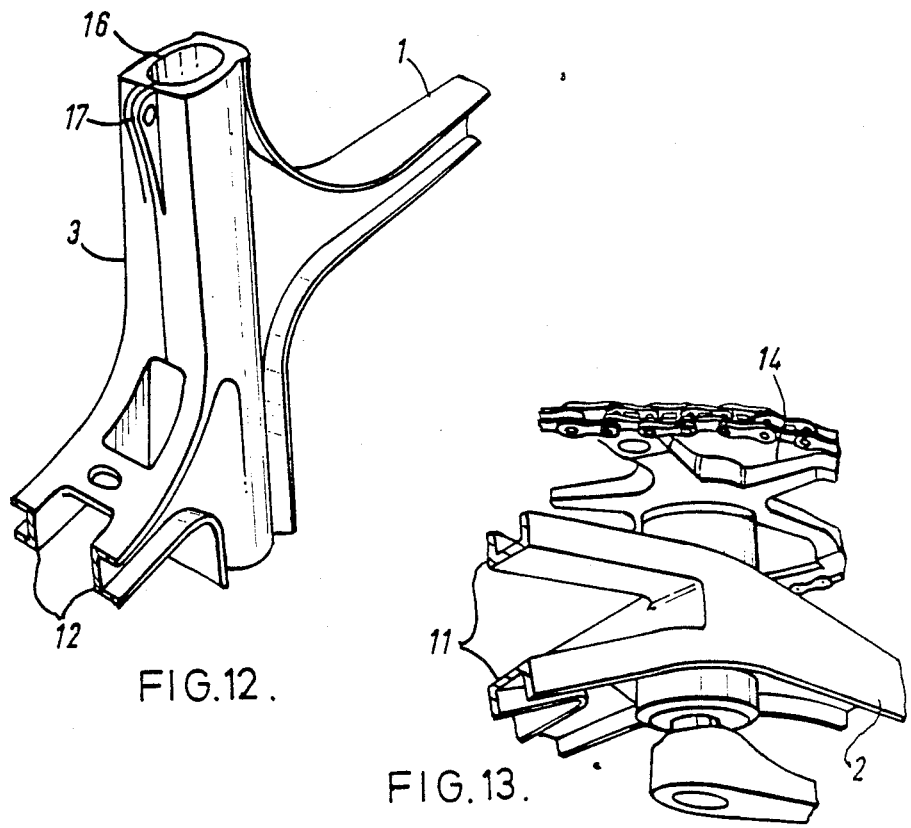
FIG.12.
FIG.13.
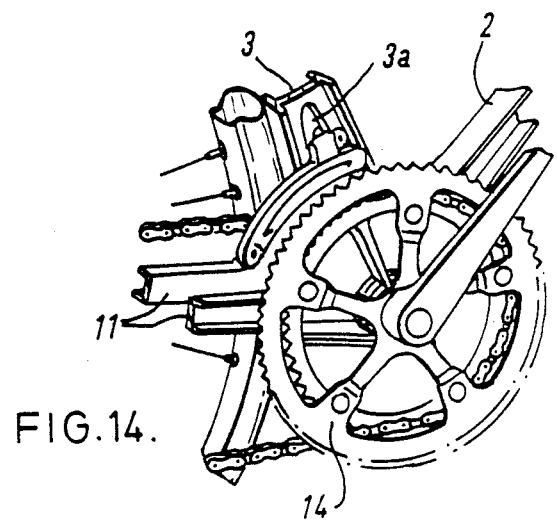
FIG.14.

BICYCLE AND FRAME THEREFOR

This is a continuation-in-part application under 37 CFR 1.62 of pending prior application Ser. No. 06/930,976, filed Nov. 13, 1986 now abandoned which is a continuation application of Ser. No. 06/654,316, filed Sept. 25, 1984 now abandoned.

This invention relates to bicycle frames.

A conventional bicycle frame consists of a saddle tube and a head which are joined by a lower tube and an upper tube. The upper tube may be generally horizontal, as in a man's bicycle, in which case it is known as a cross bar, or it may be oblique and parallel with the lower tube, as in a woman's bicycle. The head carries a bearing for the assembly of front forks and handle bar, while rear forks are carried by the saddle tube.

Conventionally, a bicycle frame is made from steel or alloy tubing. In bicycles, weight is a significant factor and in order to reduce the weight of a frame, e.g. to 4 pounds (c.2 kg), very high quality materials have to be used to obtain the desired strength. This leads to considerable expense.

An earlier proposal has been made to cast or mold bicycle frames in metal or plastics, with the emphasis on the latter. This is to be found in GB-A-1506203. The arrangement appears not to have been successfully marketed, presumably because the strength of the molded plastics frame, using I sections, was not sufficient.

SUMMARY OF THE INVENTION

The invention provides a bicycle frame having parts including the upper and lower bars cast in open section of a lightweight metal or alloy, and the open section upper and lower bars joined by a structural bridge linking them at a location between the head and the saddle stem.

The bridge, which may be of I section, has the effect of considerably increasing the torsional stiffness of the frame, which enables the use of I section bars for the upper and lower bars.

In a conventional bicycle frame, the lower bar is connected between the lower end of the head and the lower end of the saddle tube or stem, adjacent the bearing for the crank wheel.

I have discovered that when using an arrangement with open section bars, advantages are obtained by having the lower bar join the saddle tube or stem at an intermediate point. This effectively shortens the length of the beam formed by the lower bar, thereby stiffening it and also saving some material, and therefore some weight.

The section is preferably I section for the upper and lower bars and the saddle stem may be of modified I section with a tubular formation in the stem of the 1. Alternatively, the saddle stem may be of U section, having a tubular section merging or inset into the U section.

The frame may be cast in one piece with the rear forks or, alternatively, individual components or groups of components may be cast separately and fitted together, e.g. by dovetailing.

With such an arrangement, it is possible for the head to be adjustably attached to the remainder of the frame, e.g. by having a pivotal attachment to the upper bar and an adjustable connection to the lower bar to enable a small adjustment of the head angle, e.g. by ±0.5°.

The invention also provides a bicycle incorporating a bicycle frame in accordance with the invention as set forth above.

BRIEF DESCRIPTION OF THE DRAWINGS

FIG. 12 is a view taken on the arrow X of FIG. 1;

FIG. 13 is a view taken on the arrow Y of FIG. 1;

FIG. 14 is a view taken on the arrow Z of FIG. 1;

DESCRIPTION OF THE PREFERRED EMBODIMENT

Figure 1:
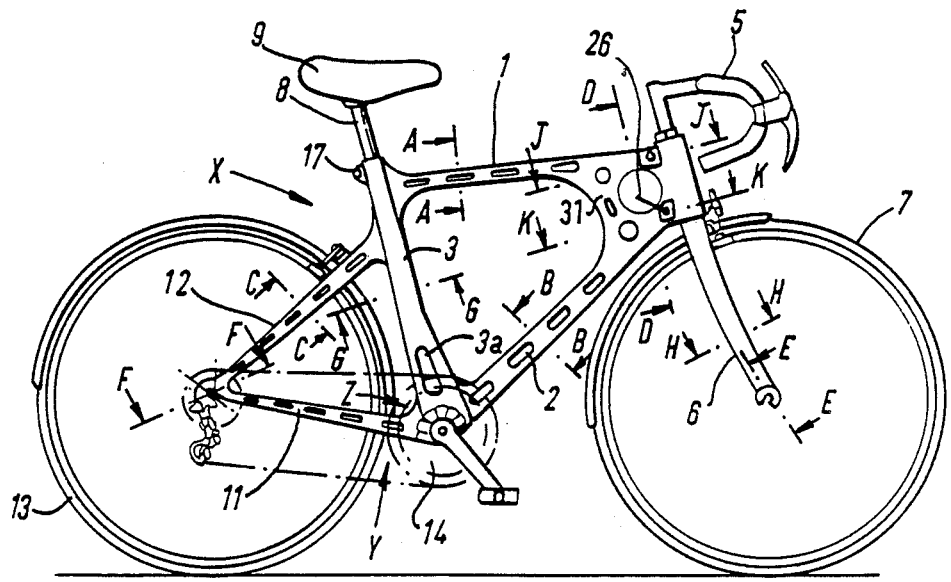
FIG. 1 is a side elevation of a bicycle incorporating a preferred form of frame in accordance with the present invention.

The bicycle frame of the open frame type illustrated in FIG. 1 has a top or cross bar 1, a lower bar 2, a saddle stem 3, and a head 4. The head 4 carries a bearing for an arrangement of a handle bar 5 and a front fork 6, which arrangement supports a front wheel 7 in a generally conventional manner.

The saddle stem 3 receives a support tube 8 for a saddle 9. In addition, the saddle stem 3 carries a rear fork arrangement comprising lower and upper forks 11, 12 respectively, supporting a rear wheel 13.

At the junction of the saddle stem 3 and lower bar 2 there is located the conventional crank wheel 14.

In the arrangement illustrated in FIG. 1, the cross bar 1, the lower bar 2, the saddle stem 3 and the rear forks 11 and 12 are cast in one piece from a magnesium-based alloy and have the open sections as illustrated in FIGS. 2 to 9.

Figure 2:
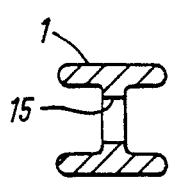
FIG. 2 is an enlarged section on the line A—A of FIG. 1.

FIG. 2 shows the cross bar 1 as being of I section and also illustrates one lightening hole 15, a plurality of which are illustrated in FIG. 1.

Figure 3:
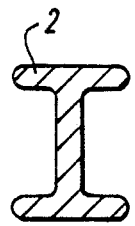
FIG. 3 is an enlarged section on the line B—B of FIG. 1.

FIG. 3 shows that the lower bar 2 is also of I section, and FIG. 1 shows lightening holes in this bar as well.

Figure 8:
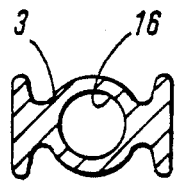
FIG. 8 is an enlarged section on the line G—G of FIG. 1.

FIG. 8 illustrates the section of the saddle stem 3 as being modified I section with a tubular portion 16 cast into the stem of the 1 to receive the saddle support tube 8.

FIG. 12 shows flanges 17 cast into the upper end of the saddle stem 3, which is split in this zone, to enable the tubular section 16 to be tightened over the saddle support tube 8 to retain the saddle in an adjusted position.

Figure 4:
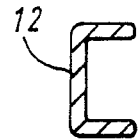
FIG. 4 is an enlarged section on the line C—C of FIG. 1.

FIG. 4 and FIG. 12 show that the rear fork 12 is of C section, and it will also be seen from FIG. 1 that both the forks 11 and 12 are provided with lightening holes. FIG. 12 also shows the arrangement of two rear forks 12, one on each side of the rear wheel 13. A similar arrangement is provided for the lower rear forks 11, which may be seen in FIG. 13.

Below the tubular section 16, the saddle stem 3 reverts to an I section as shown in FIG. 4 and widens out round a lightening hole 3a shown in FIGS. 1 and 14.

Figure 11:
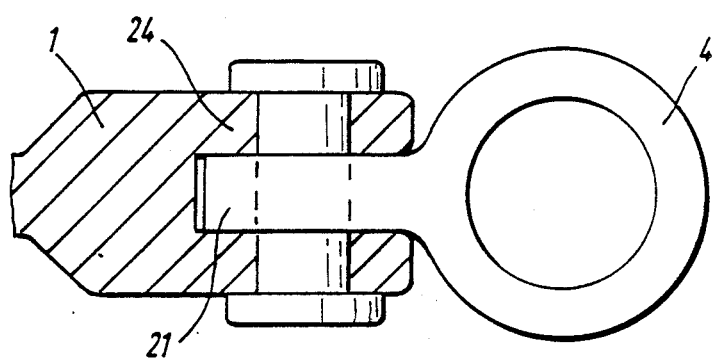
FIG. 11 is an enlarged section on the line J—J of FIG. 1.

As illustrated in FIG. 1, the head 4 is a separate casting of tubular form and has rearward extensions 21 and 22 which are received in bifurcated extensions 23 and 24 respectively of the cross bar 1 and lower bar 2 as shown in FIGS. 11 and 12 respectively.

The connection to the cross bar 1 is a pivot connection, and the connection to the lower bar 2 is by means of a member 25 eccentrically mounted solid on the shaft of an adjustment lever 26. This arrangement enables the head angle, to be varied by a small amount, e.g. by ±0.5° from a median value of 72.5°. Such an adjustment is not available on currently marketed commercial bicycles. The purpose of such an adjustment is to enable the characteristics of the bicycle to be adjusted in accordance with conditions, so that the bicycle may be satisfactory for use on racing tracks, metalled roads and gravel roads.

Figure 5:
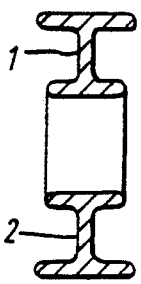
FIG. 5 is an enlarged section on the line D—D of FIG. 1.

FIG. 5 shows the section of the cross bar 1 and lower bar 2 as they approach their connections with the head 4.

An important feature of the frame as illustrated is the additional stiffening of the frame against torsion by means of a structural bridge, which is illustrated by the reference numeral 31 in FIG. 1 and extends between the cross bar 1 and the lower bar 2. This bridge 31 is cast solid with the cross-bar 1 and lower bar 2 and acts as a torsion arm so that any twisting of the frame due to deflection of the head 4 out of the plane of the frame is not resisted by the ends of the cross bar 1 and lower bar 2 remote from the saddle stem 3, but at locations considerably nearer the saddle stem 3. This decreases the effective resisting length of the beams formed by the cross bar 1 and lower bar 2, making both beams stiffer in bending and torsion. But more significant is that the increased length of torque arm across the stiff bridge 31 creates large bending deflections in both beams 1 and 2 for unit deflection of the head. This makes the torsional stiffness of the beams 1 and 2 considerably less important and the bending stiffness more important. This effect enables 1 beams, which are stiff in bending and weak in torsion, to give a torsionally rigid structure in the frame described. Conventional bicycles use tubes which have high torsional rigidity and relatively low bending strength, creating frame stiffness by the torsional rigidity of the tubes. The described frame uses weak rigidity sections which are forced to deflect in bending, which they can resist, when torsion at the head is applied.

Figure 6:
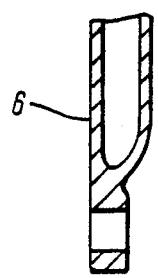
FIG. 6 is an enlarged section on the line E—E of FIG. 1.
Figure 7:
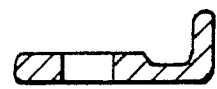
FIG. 7 is an enlarged section on the line F—F of FIG. 1.
Figure 9:
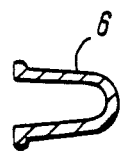
FIG. 9 is an enlarged section on the line H—H of FIG. 1.
Figure 10:
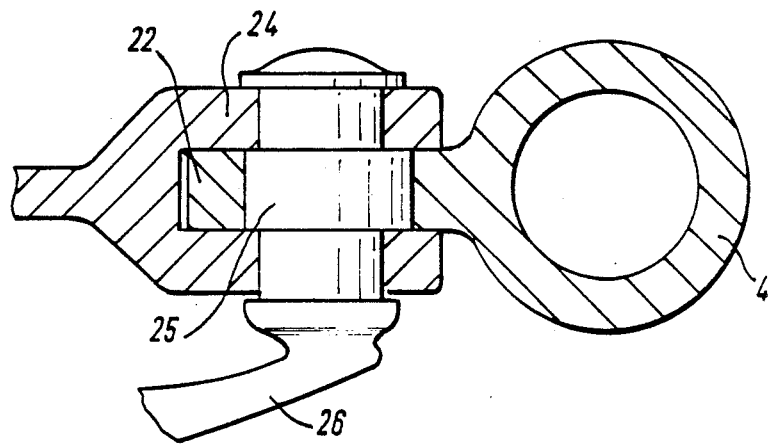
FIG. 10 is a partial enlarged section on the line K—K of FIG. 1.

FIG. 9 shows that each front fork 6 is of U section, and this is further illustrated in FIG. 6.

While the frame illustrated in FIG. 1 is of such a form that the saddle stem 3 is cast integrally with the cross bar 1 and lower bar 2, and with the forks 11 and 12, it will be appreciated that such an arrangement can lead to high tool costs, and it may therefore be preferable for the size of the individual castings to be reduced. This may be achieved by having the cross bar 1 and lower bar 2, together with the bridge 31, as one casting, and the arrangement of rear forks 11 and 12 as a further casting. These two castings would then be assembled by dovetail or other joints to the cast saddle stem 3.

DESCRIPTION OF ANOTHER EMBODIMENT

Turning now to FIGS. 15 to 22, these show an alternative form of the invention.

Figure 15:
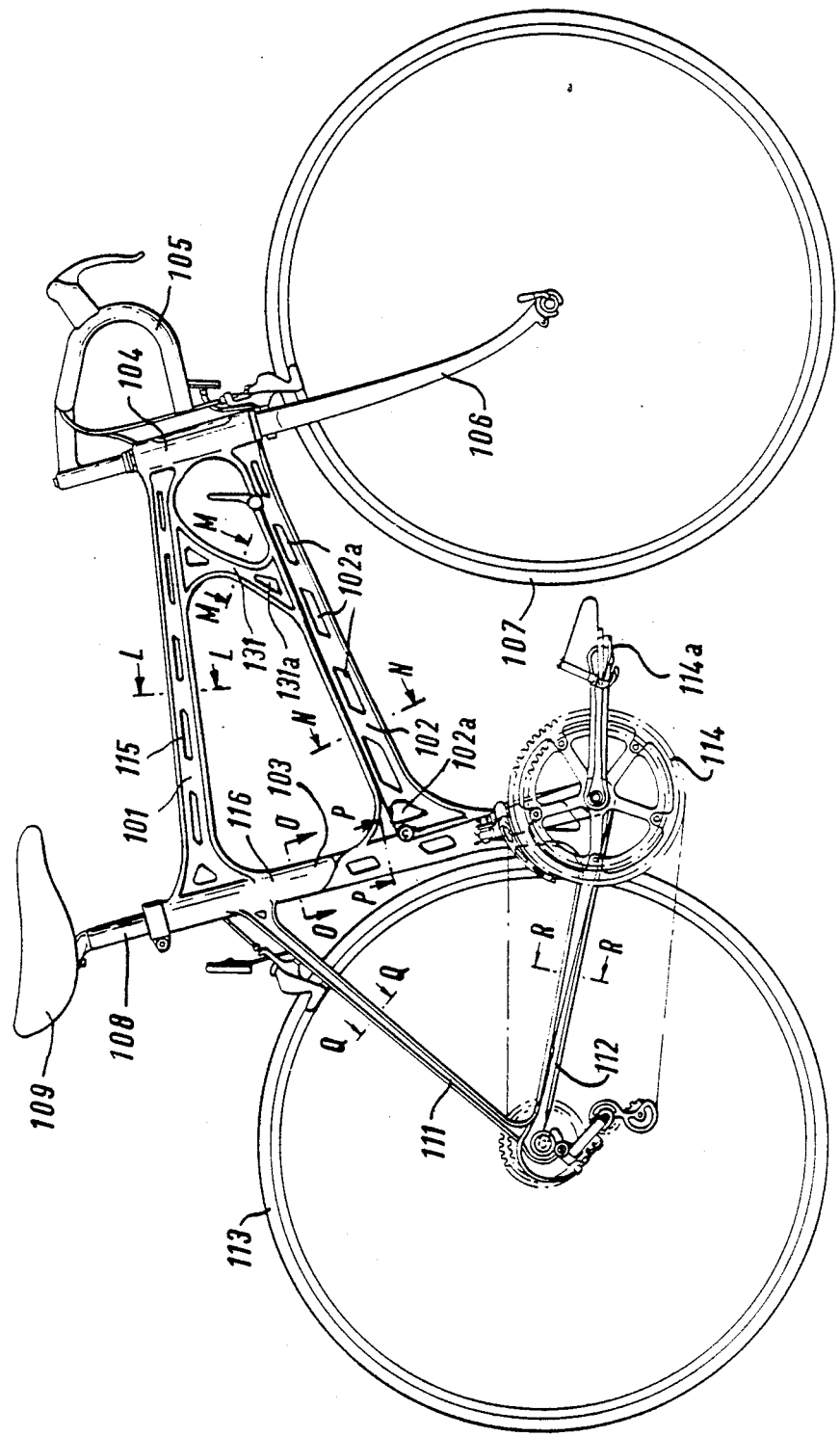
FIG. 15 is an elevation of another embodiment of a bicycle in accordance with the invention.

The bicycle frame illustrated in FIG. 15 has a top or cross bar 101, a lower bar 102, a saddle stem 103, and a head 104. The head 104 carries a bearing for an arrangement of a handle bar 105 and a front fork 106, which arrangement supports a front wheel 107 in a generally conventional manner.

The saddle stem 103 receives a support tube 108 for a saddle 109. In addition, the saddle stem 103 carries a rear fork arrangement, consisting of upper and lower rear forks 111 and 112 respectively, supporting a rear wheel 113.

At the lower end of the saddle stem 103 there is located the conventional crank wheel 114, with pedals 114a, only one of which is illustrated. As is apparent from FIG. 15, the extended axis of the lower bar 102 passes through or intersects the axis of the rear wheel 113. Thus, the axis of the lower bar 102 extends through the point of intersection of the rear fork 111, 112.

In the arrangement illustrated, the cross bar 101, the lower bar 102, a bridge 131, the saddle stem 103, and the rear forks 111 and 112 are cast in one piece from a magnesium-based alloy and have the sections as illustrated in FIGS. 16 to 22.

An important feature of the frame as illustrated is the additional stiffening of the frame against torsion by means of the structural bridge 131, which is generally similar to the bridge 31 previously described.

Figure 16:
FIG. 16 is a section taken along the line L—L of FIG. 15.
Figure 17:
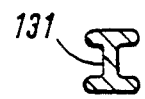
FIG. 17 is a section taken along the line M—M of FIG. 15.
Figure 18:
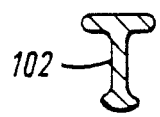
FIG. 18 is a section taken along the line N—N of FIG. 15.

The cross bar 101 is of I section as shown in FIG. 16 and also has lightening holes 115. The bridge 131 also has lightening holes 131a and is of I section as shown in FIG. 17. FIG. 18 shows that the lower bar 102 is also of I section, with one flange wider than the other, and FIG. 8 shows lightening holes 102a in this bar as well.

Figure 19:
FIG. 19 is a section taken along the line P—P of FIG. 15.
Figure 20:
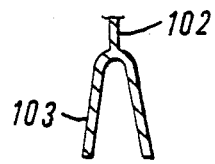
FIG. 20 is a section taken along the line Q—Q of FIG. 15.

FIGS. 19 and 20 illustrate the section of the saddle stem 103 as being of a U section, as shown in FIG. 20, merging into a tubular portion 116, as shown in FIG. 19, to receive the saddle support tube 108, which is clampable as is conventional.

Figure 21:
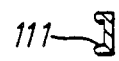
FIG. 21 is a section taken along the line R—R of FIG. 15.
Figure 22:
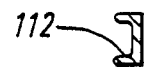
FIG. 22 is a section taken along the line S—S of FIG. 15.

FIGS. 21 and 22 show that each of the rear forks 111 and 112 is of C section. As is conventional, the arrangement includes two upper and lower rear forks 112, one on each side of the rear wheel 113. The C sections are placed back to back so that the open sections face outwardly.

The head 104 is shown as an integral casting of tubular form.

It has been found that a further improvement can be achieved by shifting the junction of the bottom bar 102 upwardly from the lower end of the saddle stem 103, as is illustrated in FIG. 15. By this means, the overall length of the bottom bar 102 is reduced, thereby further reducing of the length of the beam it forms, and also saving material, and therefore weight. In addition, there is some reinforcement of the saddle stem 103 itself.

Various other modifications may be made within the scope of the invention.

I claim:

1. A cast bicycle open frame including a cross bar, a head and a saddle stem, a lower bar linking the head and the saddle stem, a pair of rear forks having one end of each fork attached to the saddle stem, the lower bar having a longitudinal axis, the saddle stem having an intermediate portion along the length thereof, said pair of rear forks having the other end intersecting in a point of intersection, the improvement comprising the cross bar, the lower bar, the head, the saddle stem and said pair of rear forks being an integrally-formed cast frame member of lightweight metal or alloy, a structural bridge linking the cross bar and the lower bar at a location between the head and the saddle stem, the lower bar joining the saddle stem at the intermediate portion thereof such that the longitudinal axis of the lower bar intersects said point of intersection of said rear pair of forks.

2. The bicycle frame according to claim 1 wherein the frame member is of magnesium-based alloy.

3. The bicycle frame according to claim 1, wherein the cross bar and the lower bar are I-sections.

* * * * *